S. M. BEERY.
AUTOMOBILE WHEEL.
APPLICATION FILED MAR. 12, 1917.
1,260,253.
Patented Mar. 19, 1918.
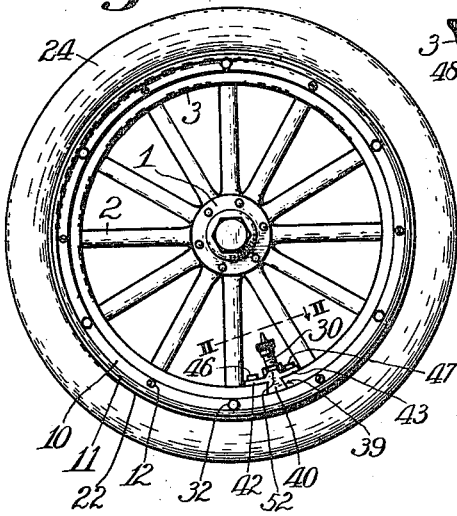
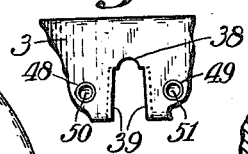
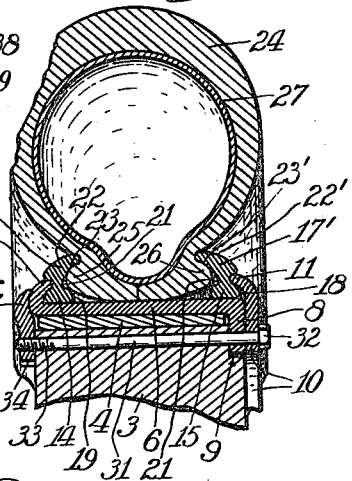
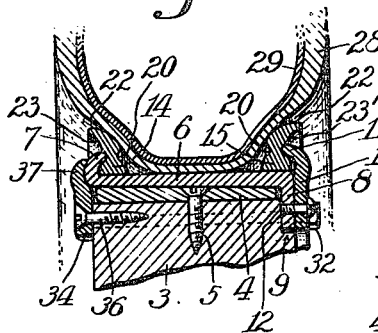
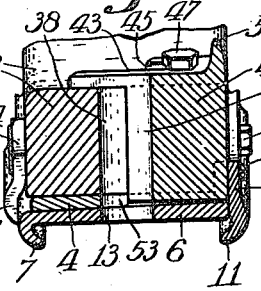
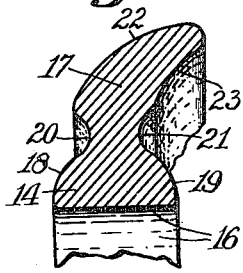
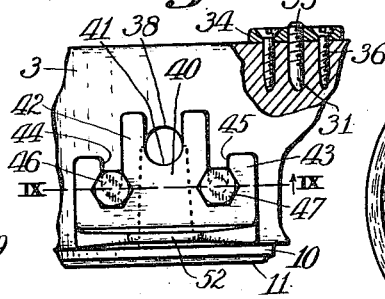
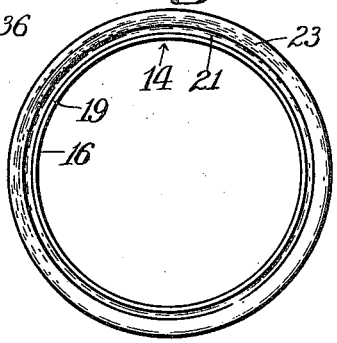
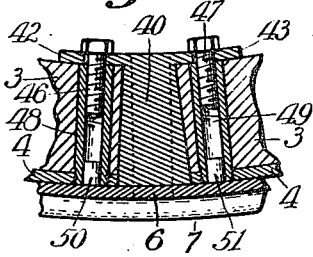
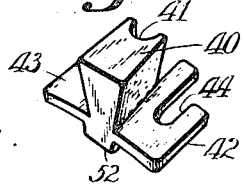
WITNESSES:
J. H. Gardner.
Myrtle McCoy.
INVENTOR:
Samuel M. Beery,
BY
E. T. Silvius,
ATTORNEY.

UNITED STATES PATENT OFFICE.

SAMUEL M. BEERY, OF EAGLE TOWNSHIP, BOONE COUNTY, INDIANA, ASSIGNOR TO TILFORD A. MERRIMAN AND EDDIE E. MERRIMAN, BOTH OF BROWN TOWNSHIP, MORGAN COUNTY, INDIANA.

AUTOMOBILE-WHEEL.

1,260,253.  Specification of Letters Patent.  Patented Mar. 19, 1918.

Application filed March 12, 1917. Serial No. 154,295.

*To all whom it may concern:*

Be it known that I, SAMUEL M. BEERY, a citizen of the United States, residing in Eagle township, in the county of Boone and State of Indiana, have invented a new and useful Automobile-Wheel, of which the following is a specification, reference being had to the accompanying drawings and to the letters and figures of reference marked thereon.

This invention relates to a type of wheel that is adapted for automobiles or motor vehicles and to be equipped with a resilient tire, of either the pneumatic type or the non-inflatable type of tire, the invention having reference more particularly to a wheel that is adapted to be equipped with either a clencher tire, a plain pneumatic tire of either the single-tube or the double-tube type, or with a rubber cushion tire, as may be preferred or found most available in emergency.

An object of the invention is to provide an improved vehicle wheel that shall be so constructed as to permit a spare tire to be carried in readiness to be quickly applied to the wheel in emergency, and more particularly so that a pneumatic tire may be carried in inflated condition and be quickly applied to the wheel without it being necessary to deflate the tire.

Another object is to provide an improved tire-carrying wheel-rim that shall be so constructed as to be able to hold an inflated pneumatic tire or other cushion when not applied to a wheel, and which shall be so constructed as to permit the wheel-rim to be quickly applied with the inflated tire thereon to the wheel.

A further object is to provide an improved wheel of the above-mentioned character which shall be of simple and inexpensive construction and not be liable to derangement, and which shall be durable and economical in use.

With the above-mentioned and other objects in view, the invention consists in a wheel having certain novel features of construction and including a detachable wheel-rim adapted to hold a tire for use when applied to the wheel, the invention consisting also further in the parts and combinations and arrangements of parts as hereinafter particularly described and further defined in the appended claims.

Referring to the drawings,—Figure 1 is a front view of one type of automobile wheel constructed substantially in accordance with the invention; Fig. 2 is a fragmentary plan view of the inner side of the wheel felly as viewed from the line II—II on Fig. 1; Fig. 3 is a transverse section of the improved felly and rim structure to which a clencher-tire is applied; Fig. 4 is a perspective view of one of the devices for securing the improved wheel rim to the wheel felly; Fig. 5 is a transverse section of the improved wheel-rim and felly with a pneumatic tire thereon of the plain double-tube type, the wheel-rim being adjusted to conform to the tire; Fig. 6 is a transverse section of the wheel-rim and felly minus the clencher-rings so as to adapt the wheel-rim to receive a plain cushion tire; Fig. 7 is a fragmentary transverse section of the improved reversible and interchangeable clencher-rings; Fig. 8 is a fragmentary plan view also as seen from the line II—II on Fig. 1 and including certain of the improved features; Fig. 9 is a section on the line IX—IX on Fig. 8; Fig. 10 is a plan view of the improved clencher-ring; and, Fig. 11 is a perspective view of a detachable part of the improved wheel felly.

On the various figures of the drawings similar reference characters indicate like elements or features of construction herein referred to and described.

A popular type of automobile wheel is illustrated for descriptive purposes and comprises a hub 1, spokes 2, and the improved felly 3 provided with the improved wheel-rim having the improved devices whereby to secure a tire thereto. The felly 3 in the present case is composed of wood and is embraced by a metallic band 4 which preferably is wedge-shaped in cross section, the thinner portion of the band being adjacent to the front of the wheel. The band is suitably secured rigidly to the felly, as by means of screws 5, and it will be understood that the band may be shrunken tightly on the felly. A rim 6 is provided which also is wedge-shaped in cross section, its inner side being tapering with respect to its outside periphery and is removable applied so as to encircle the band, the thicker portion of the rim being adjacent to the front side of the felly and embracing the thinner portion of the band, so that the rim when in place shall be tight and close fitting on the band. The thinner edge of the rim which is adjacent to the rear side of the felly has a gripper flange 7 thereon adapted to hold either a clencher-ring or to engage one side of a solid cushion tire. The opposite or front edge of the rim 6 has an inwardly-extending flange 8 thereon which preferably is received in an annular recess 9 formed in the front face of the felly. An annular clamp plate 10 is arranged against the front of the rim 6 and its flange 9 and has a gripper flange 11 thereon adapted to hold a clencher-ring on the rim or to engage a solid cushion tire that may be placed on the rim. The flanges 7 and 11 are curved so as to extend partially over the face of the rim 6. The clamp plate 10 is detachably secured to the flange 8 by means of screws 12 in order that a tire may be secured to the rim to be carried by the latter as a spare tire, a spare rim in such case being provided. The rim 6 has an aperture 13 therein to receive the inflation tube of a pneumatic tire.

Two improved reversible and interchangeable clencher-rings are provided for the rim 6 and are identically alike in structure, the clencher-rings having base portions 14 and 15 respectively, each base portion having a bore 16 of uniform diameter that is slidingly fitted closely over the exterior of the rim 6, the clencher-rings having flaring engagement portions 17 and 17' that extend from the base portions respectively. One side of each base portion has a convex face 18, the opposite side having a similar convex face 19, each face conforming in contour to the contour of the inner face of the flange 7 and the flange 11. Beyond the convex faces each ring has an annular groove 20 in one side and a similar groove 21 in the opposite side thereof, each groove being designed to receive the edge of either the gripper flange 7 or the gripper flange 11, the various peculiarities mentioned being most clearly seen in Fig. 7. The clencher-rings being assembled on the rim 6 the flaring portions 17 and 17' have oppositely disposed convex faces 22 and 22' respectively to support and retain a plain tire, the flaring portions having also concave faces 23 and 23' for engaging clencher-tires when the clencher-rings are reversely arranged on the rim. When the clencher-rings are so arranged that the concave faces 23 and 23' are presented each toward the other they are adapted to retain the tire casing 24 having clencher-ribs 25 and 26, the casing having an air-tube 27 therein; the clencher-rings when arranged in reverse order so that the convex faces 22 and 22' are presented inwardly being adapted to retain a non-clencher or plain tube or tire 28 which, when designed as a double-tube pneumatic tire contains an air-tube 29. It will be understood that each air-tube is provided with an inflation-tube 30. In order to detachably secure the rim 6 to the wheel a suitable number of retaining bolts 31 are provided and inserted through suitable holes in the clamp plate 10 and in the flange 8, the bolts extending also through suitable holes in the felly 3, each bolt having a head 32 thereon that is seated against the clamp plate 10. Each bolt has a screw-threaded end portion 33 that is screwed into a nut 34 which has a screw-threaded hole 35 to receive the end portion of the bolt. Each nut is fixedly secured to the rear side of the felly by means of screws 36 and preferably has a gripper finger 37 thereon that engages the outside of the flange 7.

In order to permit the rim 6 with an inflated tire thereon to be slipped on to the wheel the felly 3 has a suitable opening 38 therein from which a slot 39 extends to the front side of the felly to permit the inflation tube to be transversely carried in normal condition to the opening, and for the purpose of steadying the inflation tube in the opening and also excluding mud from the slot 39, a plug 40 is provided which is fitted closely into the slot and has a groove 41 adapted to clear one side of the inflation tube, the plug being provided with lateral flanges 42 and 43 whereby to reinforce the felly and also to retain the plug in place, the flanges resting on the inner side of the felly and having slots 44 and 45 therein to receive cap screws 46 and 47 that are screwed into screw-threaded tubes 48 and 49 respectively, the tubes being inserted through suitable holes in the felly and rigidly secured at their outer ends to the band 4, the ends of the tubes preferably being screwed into suitable openings in the band and being closed by means of plugs 50 and 51 respectively. The slot 39 and the plug 40 preferably are of dove tail formation adapted to prevent the plug from falling out of the slot toward the hub of the wheel, the plug being insertible in the slot from the front side of the felly. The clamp plate 10 extends partially on to the front of the plug to retain the latter in place in case the cap screws 46 and 47 are carelessly left in loose condition. The plug has a lug 52 thereon for drawing the plug from place when released. It should be noted that the band 4 has a slot 53 therein corresponding with the opening 38 and the slot 39 to permit free movement of the inflation tube of the tire.

In practical use a spare tire is mounted on a spare rim and secured thereto by the devices described for the purpose, the clamp plate being secured by the screws 12 to the flange 8 to prevent the tire when inflated from forcing the clencher-ring from the front of the rim 6. When occasion requires the removal of a damaged tire from a wheel the rim in use is removed with the tire from the wheel and, the plug 40 being removed from place permits the spare rim and tire to be quickly applied to the wheel and secured thereto without making it necessary to deflate the tire and subsequently inflate it when applied to the wheel; in most cases, however, the tire requiring further inflation. While the changing of tires is taking place the nuts 34 are retained in place and therefore cannot become misplaced or lost.

Having thus described the invention, what is claimed as new is—

1. In a vehicle-wheel, the combination of a felly having a radial opening therein and a slot extending from the opening to the front face of the felly, a plug removably secured in said slot, a band extending about and secured to said felly and having a slot therein receiving a portion of said plug, a rim encircling said band and having an aperture therein at said opening, and retaining means engaging the felly and the plug and said rim.

2. In a vehicle-wheel, the combination of a felly having a radial opening therein and a slot extending from the opening to the front face of the felly, a plug removably inserted in said slot from the front of the felly and having two flanges thereon extending laterally onto the inner side of the felly, a band extending about and secured to said felly and having a slot therein receiving a portion of said plug, two tubes spaced a distance apart and secured at one end thereof to said band on opposite sides of the slot therein and extending through said felly, two cap-screws engaging said flanges and screwed into the opposite ends of said tubes respectively, and a clencher-rim secured on said band and having an unobstructed aperture adjacent to said opening.

In testimony whereof, I affix my signature in presence of two witnesses.

SAMUEL M. BEERY.

Witnesses:
E. T. SILVIUS,
MYRTLE McCOY.